United States Patent [19]
Mashima et al.

[11] Patent Number: 6,151,656
[45] Date of Patent: Nov. 21, 2000

[54] MEMORY APPARATUS AND METHOD FOR CONTROLLING MEMORY ACCESS BASED ON MEMORY ADDRESS DIRECTIVITY

[75] Inventors: Hayateru Mashima, Hadano; Mitsuhiro Amari, Atsugi, both of Japan

[73] Assignee: Hitachi, Ltd., Tokyo, Japan

[21] Appl. No.: 09/031,543

[22] Filed: Feb. 27, 1998

[30] Foreign Application Priority Data

Mar. 3, 1997 [JP] Japan ................................... 9-048238

[51] Int. Cl.$^7$ .................................................. G06F 12/02
[52] U.S. Cl. .............................. 711/5; 711/100; 711/101; 711/102; 711/103; 711/104; 711/105; 711/170; 711/202
[58] Field of Search ......................... 365/230.03, 230.04; 711/5, 100–105, 170, 202, 51

[56] References Cited

U.S. PATENT DOCUMENTS

| | | | |
|---|---|---|---|
| 4,683,552 | 7/1987 | Kambayashi et al. | 345/194 |
| 4,752,915 | 6/1988 | Suzuki et al. | 365/230.03 |
| 4,956,717 | 9/1990 | Suzuki et al. | 358/296 |
| 4,996,650 | 2/1991 | Kenbo | 395/105 |
| 5,105,472 | 4/1992 | Murayama | 382/199 |
| 5,210,822 | 5/1993 | Tsuchiya et al. | 395/115 |
| 5,413,419 | 5/1995 | Oami et al. | 400/61 |
| 5,754,164 | 5/1998 | Yutani et al. | 345/471 |

FOREIGN PATENT DOCUMENTS 61-80339 4/1986 Japan ................................ G06F 12/06

*Primary Examiner*—Do Hyun Yoo
*Assistant Examiner*—Than Nguyen
*Attorney, Agent, or Firm*—Mattingly, Stanger & Malur, P.C.

[57] ABSTRACT

In a printer control apparatus having a two-dimensional address type full dot memory, this full dot memory is constituted by a longitudinal/lateral-direction highspeed memory with a highspeed access operation along an x address direction, an oblique-direction highspeed memory with both access speeds in x address and y address direction, and another longitudinal/lateral-direction highspeed memory with a highspeed access operation along a y address direction. A directivity of a dot pattern is judged by a memory control unit, and this dot pattern is expanded from print data by a data processing unit, and then is written into a full dot memory. Any one of the longitudinal/lateral-direction highspeed memory, the oblique-direction highspeed memory, and the longitudinal/lateral-direction highspeed memory is selected based on the directivity judgment result to expand the dot pattern into the selected memory.

4 Claims, 8 Drawing Sheets

| LONGITUDINAL/LATERAL SELECTION SIGNAL(S) | MEMORY ADDRESS | REAL ADDRESS |
|---|---|---|
| 0 | ROW ADDRESS | y ADDRESS |
| 0 | COLUMN ADDRESS | x ADDRESS |
| 1 | ROW ADDRESS | x ADDRESS |
| 1 | COLUMN ADDRESS | y ADDRESS |

X COMPONENT (LATERAL LINE)    Y COMPONENT (LONGITUDINAL LINE)

MEMORY APPARATUS AND METHOD FOR CONTROLLING MEMORY ACCESS BASED ON MEMORY ADDRESS DIRECTIVITY

BACKGROUND OF THE INVENTION

The present invention generally relates to a memory access control technique. More specifically, the present invention is directed to a memory access control technique that is suitable to access control for a memory managed by two-dimensional address.

As a conventional memory access control system, for instance, JP-A-61-80339 discloses the memory access control system such that the memory managed by the two-dimensional address is subdivided into a plurality of memory banks, and the memory banks are switched every time the X address and the Y address are switched in order to avoid the access concentration when accessing to the memory banks. Thus, the memory banks can be accessed at high speed.

SUMMARY OF THE INVENTION

An object of the present invention is to provide a memory access technique capable of accessing in a high speed a memory managed by a two-dimensional address regardless of a directivity of address changes which occurs during an access operation, and of realizing a continuous access operation of a data set such as a bit map.

Another object of the present invention is to provide a memory access control technique capable of controlling a full dot memory managed by a two-dimensional address, in which a bit map of an arbitrary figure can be expanded at a high speed.

In a printer for printing out two-dimensional data such as a figure, print data are not supplied in accordance with the data output sequence, but the print data is outputted to an arbitrary place within a printing paper, which is designated by the sent data. As a consequence, a control apparatus for such a printer is equipped with a memory for holding all pixel (dot) data corresponding to a printing paper, and expands a dot pattern to an arbitrary position corresponding to an output page within this memory. This memory corresponding to the printing paper is managed by a two-dimensional address (X address, Y address) in order to be correspond with the physical coordinate values on the printing paper.

Generally speaking, such a print control apparatus, will employ a control system capable of continuously printing a plurality of pages, in which while print data about a certain page is outputted, a subsequent page is formed. In this print control operation, if forming of the subsequent page is not completed while outputting the print data about one arbitrary page, then the printer must be stopped due to print data waiting operation. Under this condition, highspeed memory access operation is necessarily required.

FIG. 11 represents such a diagram that addresses are allocated to a memory having a 4-byte data width in correspondence with a paper. While such an address-allocated memory is used, when 128 dots of a lateral line of this figure are expanded along the X direction, and 128 dots of a longitudinal line thereof are expanded along the Y direction, the resultant expanding process time of the former dot expansion is completely different from that of the latter dot expansion. The reason is given as follows. When as a memory capable of processing 32-dot data in a batch manner, a DRAM is employed, since a page mode access operation is available within a page boundary, in which only a column address is switched, the highspeed data access operation can be achieved. To the contrary, since the data access operation is carried out by switching the memory address every 1 dot along the Y direction, the expanding process operation is delayed.

FIG. 12 is a conceptual diagram for schematically explaining a conventional memory access control system such as that disclosed in JP-A-61-80339. As previously explained, every time the X address and the Y address are changed, the memory banks are switched. In accordance with this memory access control system, when the data dot of the longitudinal line is expanded, the memory banks are switched every time. As a result, in this memory control system, the dot data can be expanded in a higher speed than that of the memory access control system shown in FIG. 11. Since the memory banks are switched every time the X address and the Y address are changed, a difference between the expanding performance in the X direction and the expanding performance in the Y direction will depend on the effect of the data widths. Assuming now that the data width is selected to be 4 bytes, 32-dot data can be expanded/processed within one time along the X direction, whereas 1-dot data can be expanded/processed within one time along the Y direction. As a result, the expanding process for the Y direction (longitudinal line) becomes 1/32 times higher than the expanding process for the X direction (longitudinal line).

In other words, even when the memory access control system disclosed in JP-A-61-80339 is introduced, a technical problem still remains in the figure expanding process speed such as drawing of a longitudinal line.

In a memory access control method, according to an aspect of the present invention, there are provided a plurality of memories whose address mapping is logically, or physically different from each other. In response to a directivity of address changes in a data set such as bit map data accessible to these memories, such a memory having address mapping, the accessing time of which is shorter than other memories, is selected to be accessed.

Also, a memory access control apparatus, according to another aspect of the present invention, is featured by comprising: a plurality of memories, the address mapping of which is logically, or physically different from each other, and which are managed by a two-dimensional address constructed of a first address and a second address; an address changing apparatus for mutually changing the first address and the second address; a judging apparatus for judging a directivity of address changes in a data set continuously accessible to the memories; and a selecting apparatus for selecting the memories accessed, depending upon sorts of the directivity.

Alternatively, the memory access control apparatus may be constituted by employing a memory logic hybrid LSI made by that these plural memories, and a control logic capable of realizing at least one of the address changing means, the judging means, and the selecting means are packaged with the same LSI chip.

The memory access control method, according to the present invention, has such an effect that a memory access technique is capable of accessing in a high speed the memory managed by the two-dimensional address regardless of the directivity of address changes which occur during the access operation, and of realizing the continuous access operation of the data set such as the bit map.

Also, the memory access control method, according to the present invention, owns another effect that a memory access control technique is capable of controlling the full dot memory managed by the two-dimensional address, in which the bit map of the arbitrary figure can be expanded in a high speed.

Also, the memory access control apparatus, according to the present invention, has such an effect that a memory access technique is capable of accessing in a high speed the memory managed by the two-dimensional address regardless of the directivity of address changes which occur during the access operation, and of realizing the continuous access operation of the data set such as the bit map.

Moreover, the memory access control apparatus, according to the present invention, has such an effect that a memory access control technique is capable of controlling the full dot memory managed by the two-dimensional address, in which the bit map of the arbitrary figure can be expanded in a high speed.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

Referring now to drawings, an embodiment mode of the present invention will be described in detail.

Figure 1:
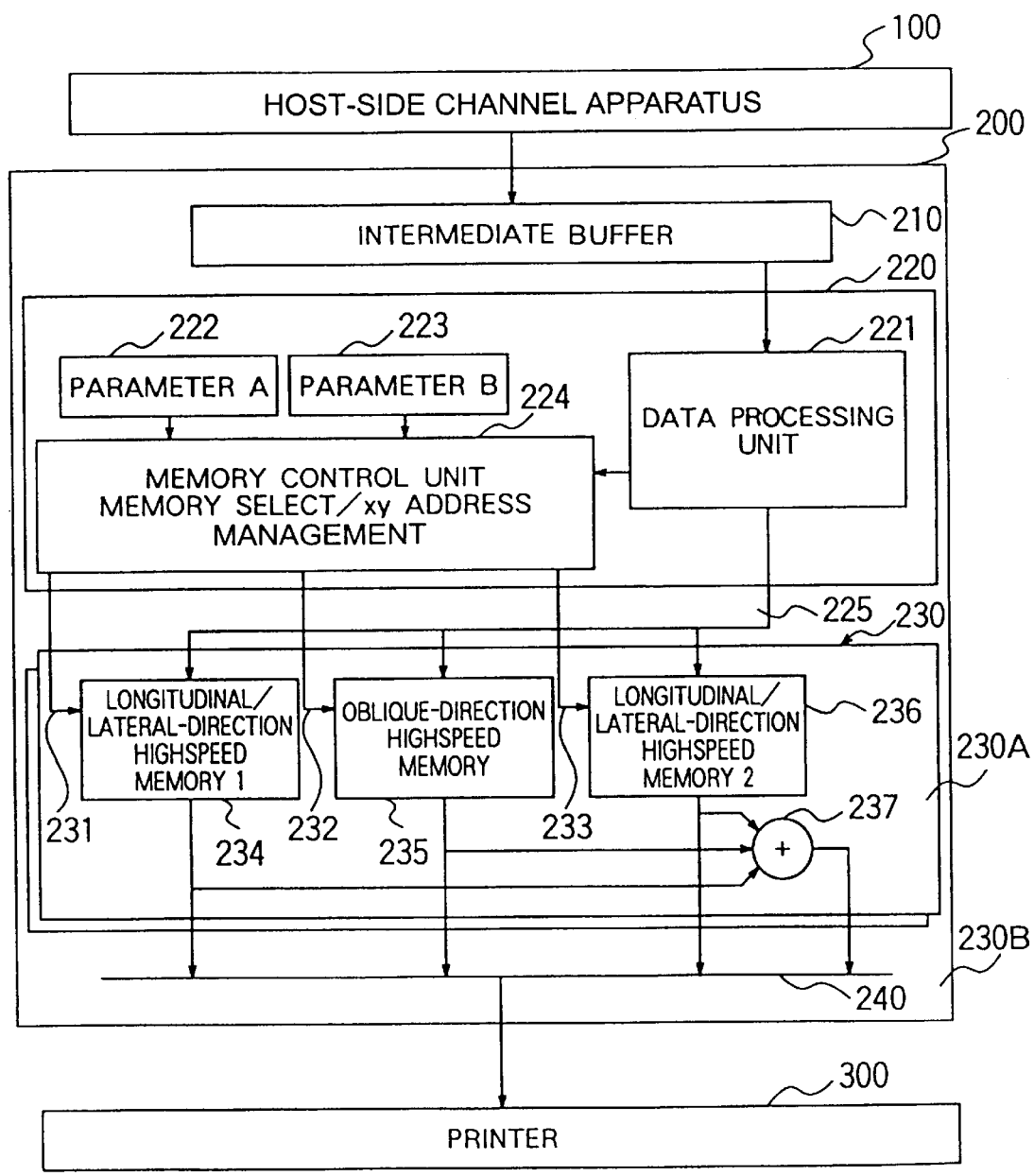
FIG. 1 is a conceptual diagram for representing an example of an arrangement of a printing system containing a printer control apparatus to which a memory access control method and a memory access control apparatus, according to one embodiment of the present invention, have been applied.

FIG. 1 is a conceptional diagram for representing an example of an arrangement of a printing system involving a printer control apparatus, to which a memory access control method and a memory access control apparatus, according to an embodiment mode of the present invention have been applied.

It should be understood that although the below-mentioned embodiment will describe a printer, the present invention is not limited thereto, but may be applied to other apparatuses, for example, a graphic accelerator of a personal computer, a display apparatus, and a color printer. It should also be noted that although a DRAM (dynamic random access memory) is explained as an example of a memory element in the following embodiment mode, not only this DRAM, but also an SRAM (static random access memory) and other various memory elements may be employed in the present invention.

As illustrated in FIG. 1, a printing system, according to this embodiment mode, is arranged by a host-sided channel apparatus 100, a printer control apparatus 200, and a printer 300. The printer control apparatus 200 is constituted by an intermediate buffer 210, a data processing processor 220, a full dot memory 230, a selector 240, and so on.

Alternatively, the printer control apparatus 200, according to this embodiment mode, which is constituted by the intermediate buffer 210, the data processing processor 220, the full dot memory 230, and the memory 240, may be arranged by employing, for instance, such a memory logic hybrid LSI made by that a memory element for constituting the intermediate buffer 210 and the full dot memory 230, and also a control logic circuit capable of realizing the data processing processor 220 having a control function (will be discussed later) and the selector 240 are packaged on the same LSI chip.

The data processing processor 220 contains a data processing unit 221, a memory control unit 224, a bus 225 for a dot pattern, a parameter setting unit 222 and another parameter setting unit 223, into which parameter information such as a threshold value and used to control operations of the memory control unit 224 (will be discussed later) is set. These parameter setting units 222 and 223 are arranged as a register and the like accessible by the memory control unit 224 in such a manner that, for instance, a setting command issued from a host-sided (upper-graded) channel apparatus 100, and an externally supplied content are arbitrarily set via a control panel (not shown) connected to the printer control apparatus 200.

The full dot memory 230 includes exclusively-used memories called as a longitudinal/lateral-direction highspeed memory 234(1) managed by a two-dimensional address, an oblique-direction highspeed memory 235, and another longitudinal/lateral-direction highspeed memory 236(2). The full dot memory 230 with such an arrangement is constituted by, for example, a two-plane structure of a memory plane 230A and another memory plane 230B. Then, a plurality of pages can be continuously printed by alternately executing a data reading operation and a data writing operation in a parallel manner without an occurrence of a waiting state of printing operation by a printer 300, which is caused by a waiting state until the data writing operation to the full dot memory 230 is completed. In the data reading operation, print data for a preceding page is read from one memory plane 230A(B) to the printer 300. In the data writing operation, print data for a succeeding page is written from the data processing processor 220 to the other memory plane 230B(A).

Figure 2:
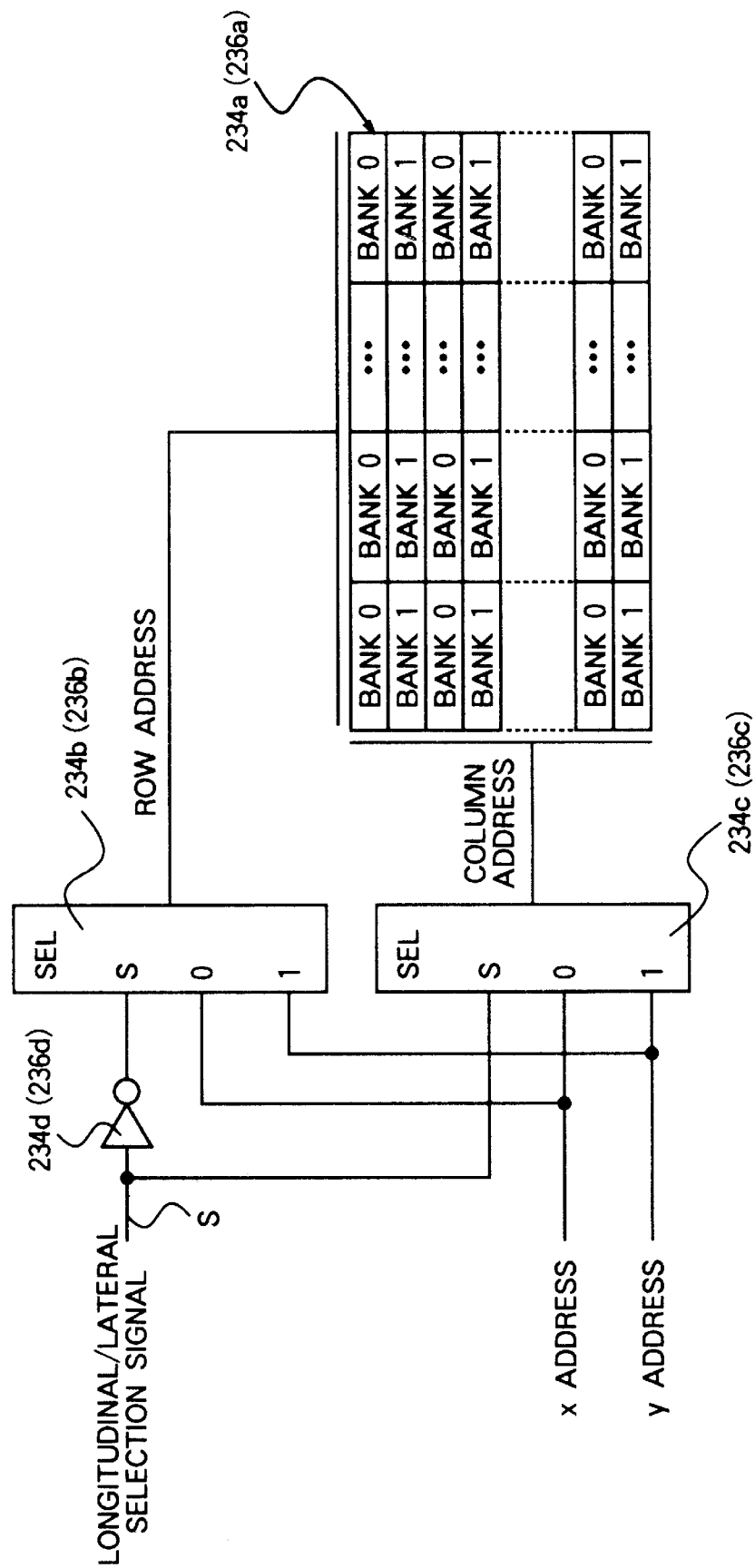
FIG. 2 is a conceptional diagram for indicating an example of a memory for constituting a full dot memory employed in a printer control apparatus to which the memory access control method and the memory access control apparatus, according to one embodiment of the present invention, have been applied.

As illustrated in FIG. 2, the longitudinal/lateral-direction highspeed memory 234(1), and the longitudinal/lateral-direction highspeed memory 236(2) each own such a common memory structure. That is, each of these longitudinal/lateral-direction highspeed memories 234(1) and 236(2) is constituted by a memory medium 234a (memory medium 236a) with a plural bank structure; a plurality of selector 234b (selector 236b) and selector 234c (selector 236c) capable of executing an operation for alternately changing corresponding relationships with respect to a row address/a column address in the memory medium 234a (memory medium 236a) of the x address and y address; and an inverter 234d (inverter 236d) for causing the selecting operations of the selector 234b (selector 236b) and the selector 234c (selector 236c) to be mutually inverted in response to a longitudinal/lateral selection signal "S" equal to a common logic signal.

For the sake of simple explanation, FIG. 2 illustrates the two-bank structure along the column address direction in the memory medium 234a (memory medium 236a) with the plural bank structure. Alternatively, this memory medium 234a, or the memory medium 236a may be arranged by an n-bank structure, and symbol "n" is a natural number larger than, or equal to 3.

Figures 3, 4:
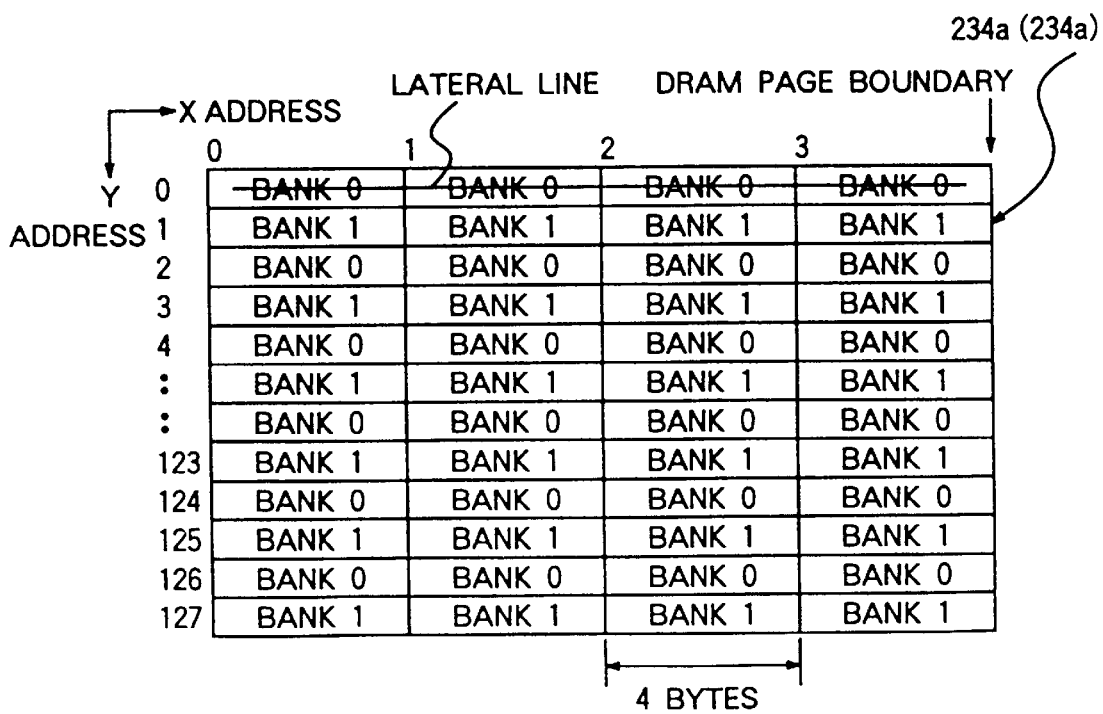
FIG. 3 is a conceptional diagram for representing an example of effects of a control signal used in the printer control apparatus to which the memory access control method and the memory access control apparatus, according to one embodiment of the present invention, have been applied.
FIG. 4 is a conceptional diagram for indicating an example of the memory for constituting the full dot memory employed in the printer control apparatus to which the memory access control method and the memory access control apparatus, according to one embodiment of the present invention, have been applied.
Figure 5:
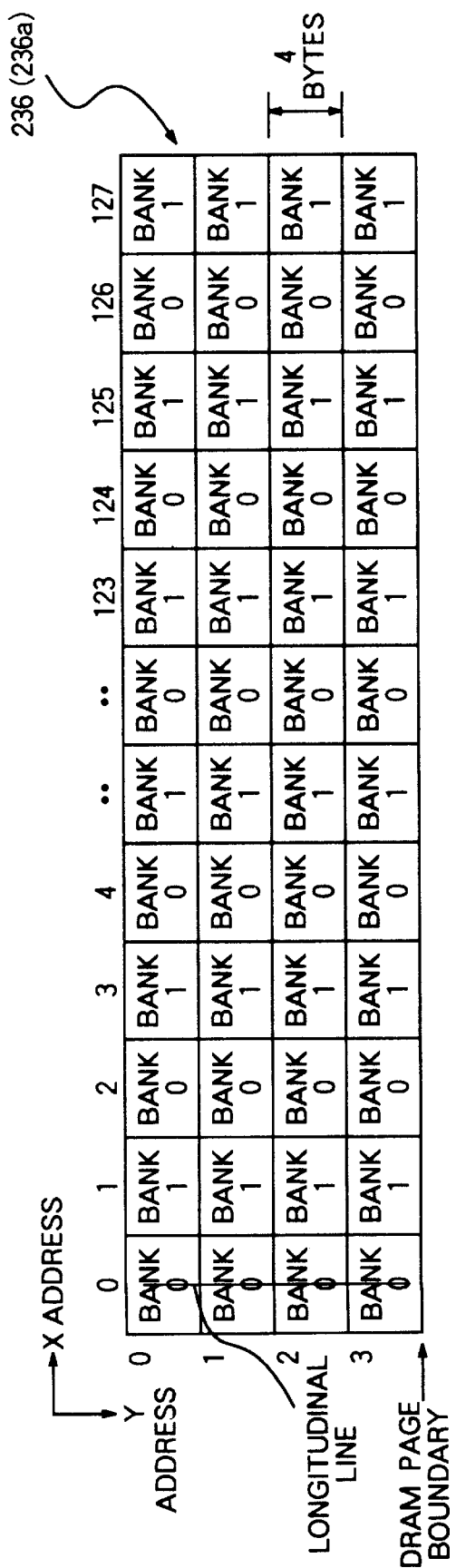
FIG. 5 is a conceptional diagram for indicating an example of the memory for constituting the full dot memory employed in the printer control apparatus to which the memory access control method and the memory access control apparatus, according to one embodiment of the present invention, have been applied.

Then, as shown in FIG. 3, in response to the logic states of the longitudinal/lateral selection signal "S" entered into the inverter 234d (inverter 236d), the x address and the y address are mutually changed, so that different address mapping operations may be carried out to such a memory having the same physical structure, as illustrated in FIG. 4 and FIG. 5.

Figure 6:
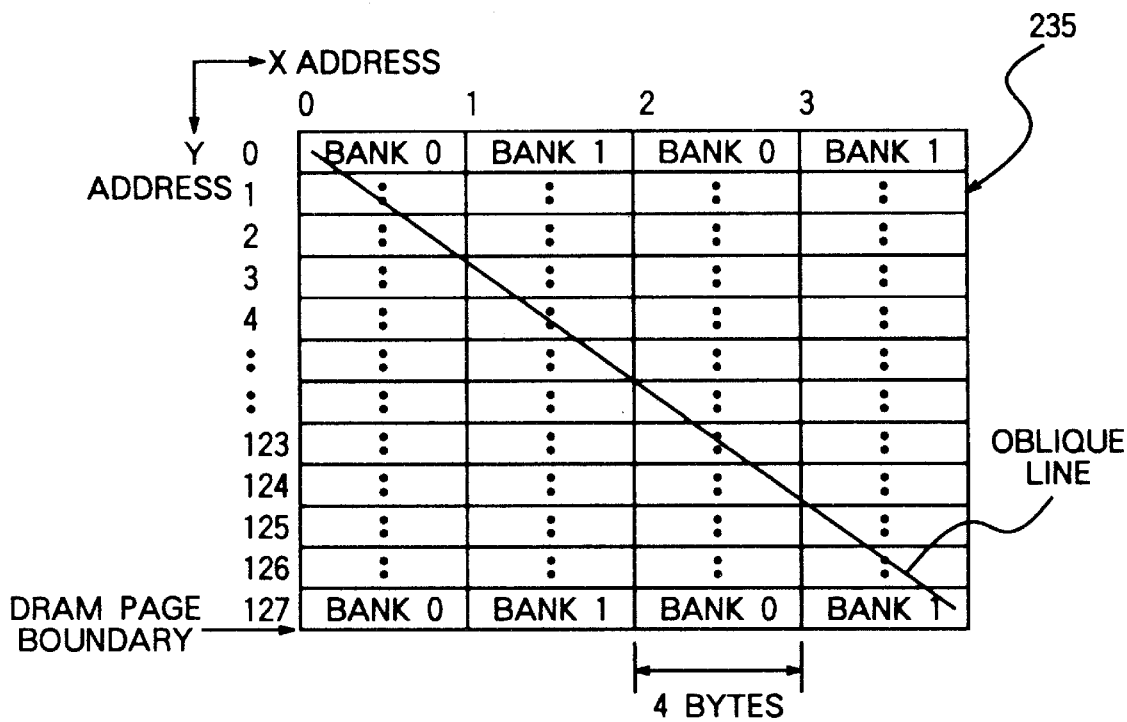
FIG. 6 is a conceptional diagram for indicating an example of the memory for constituting the full dot memory employed in the printer control apparatus to which the memory access control method and the memory access control apparatus, according to one embodiment of the present invention, have been applied.

As illustrated in FIG. 6, the oblique-direction highspeed memory 235 is so arranged by that 4 bytes (namely 32 bits) of different banks are accessed along the x-address direction every time this x address is changed, whereas 1 bit within the same bank is accessed along the y-address direction.

For the sake of simple description, FIG. 6 shows the two-bank structure along the x address (row address) direction in the oblique-direction highspeed memory 235. Alternatively, this oblique-direction highspeed memory 235 may be arranged by an n-bank structure, and symbol "n" is equal to a natural number larger than, or equal to 3.

In this case, describing a flow operation of print data, the print data sent from the host-sided channel apparatus 100 to the printer control apparatus 200 is acquired by the intermediate buffer 210 employed in the printer control apparatus 200. This print data is expanded to a dot pattern (bit pattern) by the data processing unit 221 employed in the data processing processor 220, and then the dot pattern is written into the full dot memory 230. As previously described, in order that the dot data expanded by the data processing unit 221 can be accessed in a high speed, the full dot memory 230 is arranged by such an exclusively-used memory as the longitudinal/lateral-direction highspeed memory 234(1), the oblique-direction highspeed memory 235, and the longitudinal/lateral-direction highspeed memory 236(2). As previously explained with reference to FIG. 2, the longitudinal/lateral-direction highspeed memory 234(1) and the longitudinal lateral-direction highspeed memory 236(2) are made by the completely same memory structures, and are operable in different manners in response to the longitudinal/lateral selection signal S.

Since coordinate information of a dot pattern sent from the data processing unit 221, and also a parameter A and a parameter B, which are set to the parameter setting unit 222 and the parameter setting unit 223 respectively, are inputted into the memory control unit 224, this memory control unit 224 may judge as to which exclusively-used memory is accessed/selected. For instance, when the memory control unit 224 judges that a certain dot pattern corresponds to an x component, the longitudinal/lateral-direction highspeed memory 234(1) is accessed. Also, when the memory control unit 224 judges that a certain dot pattern corresponds to an xy component (oblique component), the oblique-direction highspeed memory 235 is accessed. Further, when the memory control unit 224 judges that a certain dot pattern corresponds to a y component, the longitudinal/lateral-direction highspeed memory 236(2) is accessed. These access operations are classified to be stored.

The memory control unit 224 manages the x addresses and the y addresses of the respective exclusively-used memories based on the coordinate values corresponding to papers, and enters these x address and y address via an address line 231, an address line 232, and an address line 233 into the respective exclusively-used memories. As described above, the memory regions within each of the exclusively-used memories are banked, and when an access exceeding a page boundary of the DRAM is produced, different banks are accessed in a parallel manner, so that these exclusively-used memories can be accessed in high speeds. Also, the exclusively-used memories own a read modify write function, and a read/clear function. The dot patterns saved in each of the exclusively-used memories are simultaneously read out by using the addresses of the x-y coordinate system corresponding to the paper by the memory control unit 224. These read dot patterns pass through an OR processing unit 237, and then are synthesized as data about one page, and thus the synthesized one-page data is transferred to the printer 300. For example, the print data is printed while setting a dot "1"=black pixel, and a dot "0"=white pixel. Alternatively, the dot patterns saved in the respective exclusively-used memories may be directly supplied via a selector 240 to the printer 300 for the printing operation.

Figure 7:
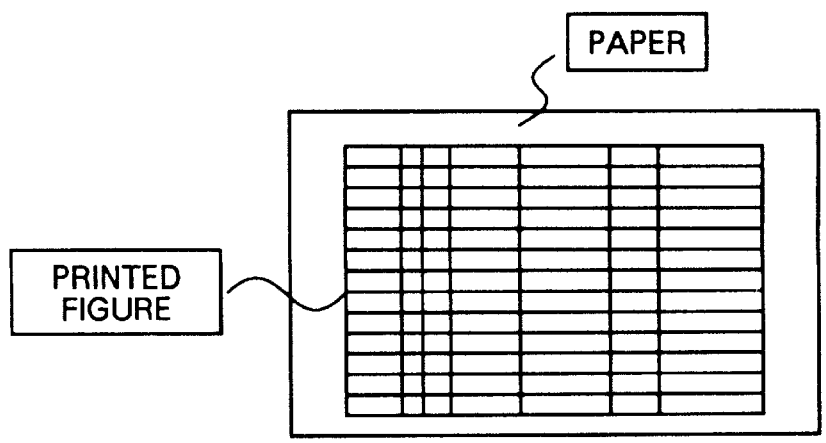
FIG. 7 is a conceptional diagram for indicating an example of print data expanded in the full dot memory employed in the printer control apparatus to which the memory access control method and the memory access control apparatus, according to one embodiment of the present invention, have been applied.
Figure 8:
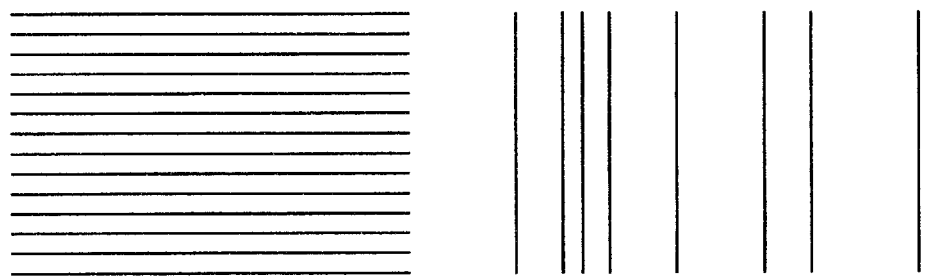
FIG. 8 is a conceptional diagram for indicating an example of a dot pattern expanded from the print data expanded in the full dot memory employed in the printer control apparatus to which the memory access control method and the memory access control apparatus, according to one embodiment of the present invention, have been applied.

FIG. 7 is an explanatory diagram for illustrating a figure in which figure elements having different directivities are mixed, for instance, a table, a ruled line, and the like being printed on a paper. FIG. 8 is an explanatory diagram for illustrating such an example that this figure (dot pattern) of FIG. 7 is dissolved into a component along the x direction and another component along the y direction. Normally, the figures such as the table and the ruled line as shown in FIG. 7 are supplied from the host-sided (upper-graded) channel apparatus 100 as the print data made of vector data about a plurality of line segments. The coordinate values of the both ends of these line segments, and widths thereof are designated. In the data processing unit 221, the following writing operation is carried out. That is, a dot pattern for constituting a lateral line and a longitudinal line illustrated in FIG. 8 is separately produced from the vector data of each of these line segments, and then the dot pattern is written into the full dot memory 230 in the data processing unit 221.

Figure 11:
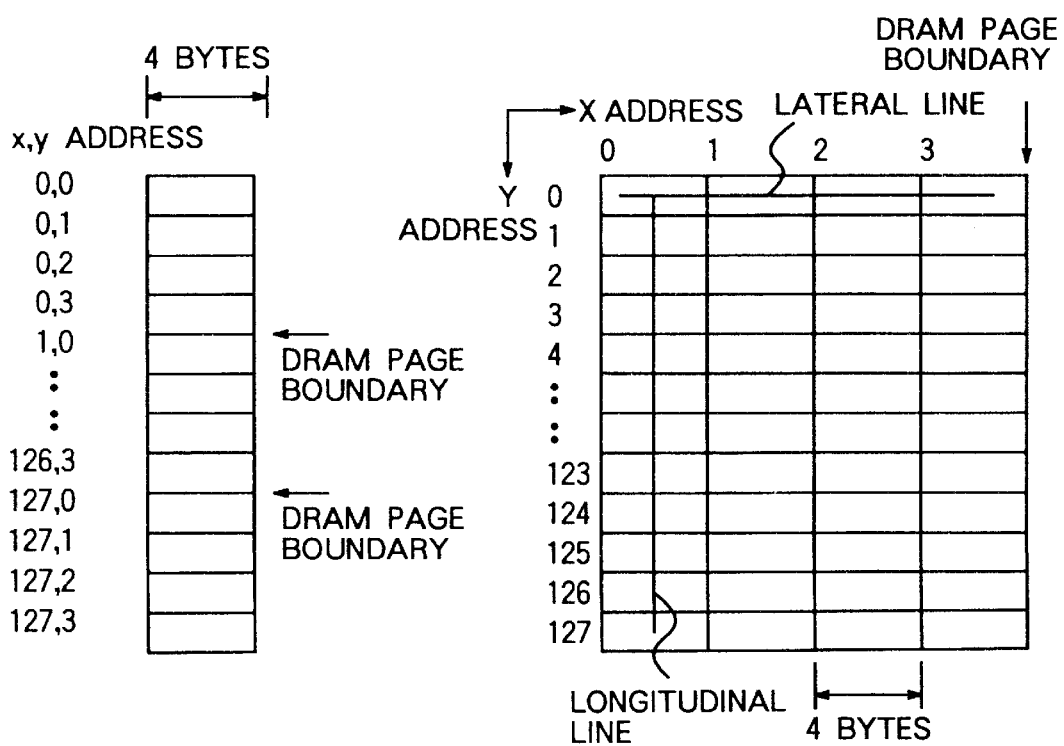
FIG. 11 is a conceptional diagram for indicating one example of expanding of a dot pattern for a memory with a two-dimensional address.
Figure 12:
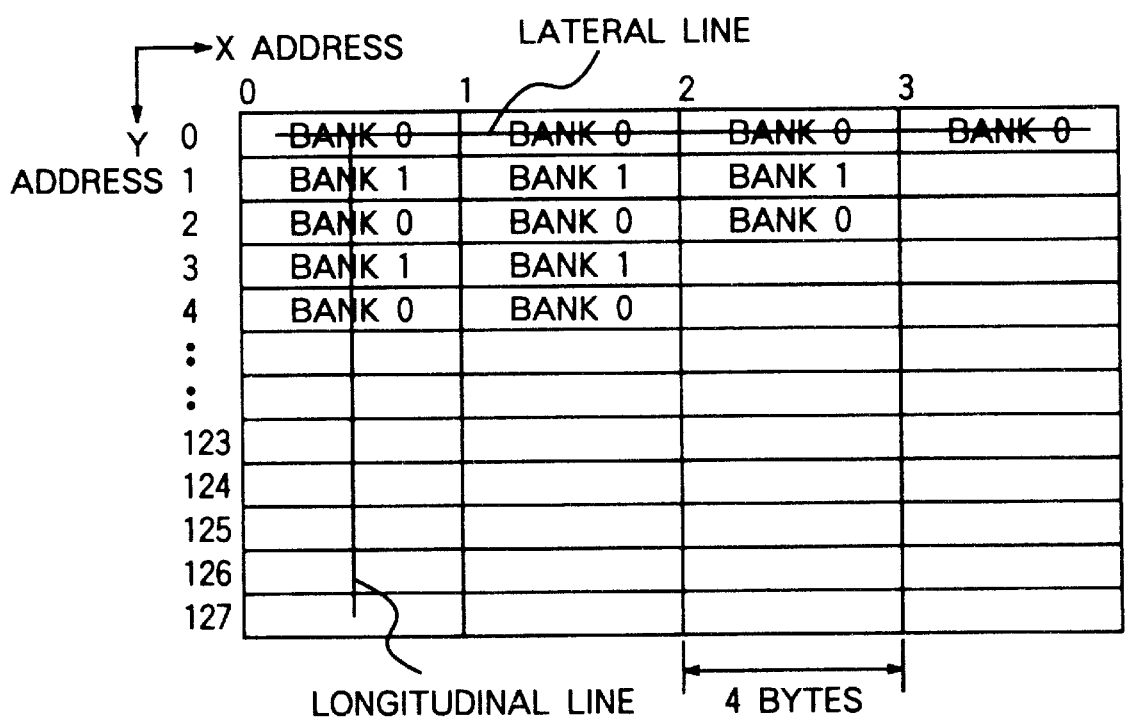
FIG. 12 is a conceptional diagram for showing one example of the conventional memory access control system.

At this time, in the conventional printer control apparatus in which the memory access control is carried out only for such a specific address mapping operation as shown in FIG. 11, the x component (lateral line) can be expand-processed in the high speed, whereas when the y component (longitudinal line) is frequently produced, the lengthy memory access time is required when the dot pattern is expanded, resulting in lowering of the printing performance. In the worst case, no continuous printing operation can be done by the conventional printer control apparatus. Thus, there is such a risk that the printer 300 is stopped, since the printer 300 should wait the completion of the data writing operation into the full dot memory 230 every time one page is printed out, resulting in lowering of the printing speed thereof.

To the contrary, in the case of the printer control apparatus according to this embodiment, as indicated in FIG. 4 and FIG. 5, the exclusively-used memories in which the address mapping operations are different from each other, depending upon the exchange of the x address and the y address, are selectively used in response to the x component and the y component, so that the highspeed memory access control can be achieved.

In other words, FIG. 4 represents such a longitudinal/lateral-direction highspeed memory 234(1) which is arranged by a DRAM having a 4-byte data width address-mapped in correspondence with a paper, and in which a writing operation for x-direction component can be carried out in high speed.

In the case that, as represented in FIG. 4, a lateral line (dot pattern) constructed of 128 dots is expanded along the X direction into this longitudinal/lateral-direction highspeed memory 234(1), since this highspeed memory 234(1) can be accessed in unit of 4 bytes, the entire 128 dots can be expanded by performing the access operations 4 times. The memory region is subdivided into the plural banks in order that while a memory of a certain bank is being accessed, another bank access operation can be done, so that the y address is made in a high speed. If the longitudinal/lateral direction highspeed memory 234(1) with such an address mapping system is employed, the x component (lateral line) shown in FIG. 8 can be expanded in a high speed, as previously explained.

Also, FIG. 5 represents such a longitudinal/lateral-direction highspeed memory 236(2) which is arranged by a DRAM having a 4-byte data width address-mapped in correspondence with a paper, and in which a writing operation for y-direction component can be carried out in high speed.

In the case that, as represented in FIG. 5, a longitudinal line (dot pattern) constructed of 128 dots is expanded along the y direction into this longitudinal/lateral-direction highspeed memory 236(2), since this highspeed memory 236(2) can be accessed in unit of 4 bytes, the entire 128 dots can be expanded by performing the access operations 4 times. The memory region is subdivided into the plural banks in order that while a memory of a certain bank is being accessed, another bank access operation can be done, so that the x address is made in a high speed. If the longitudinal/lateral direction highspeed memory 236(2) with such an address mapping system is employed, the y component (longitudinal line) can be expanded in a high speed, as previously explained.

In accordance with this embodiment mode, as previously explained, the longitudinal/lateral-direction highspeed memory 234(1) and the longitudinal/lateral-direction highspeed memory 236(2) with the different address mapping systems as indicated in FIG. 4 and FIG. 5 may be realized by merely changing the longitudinal/lateral selection signal S, with employment of the common memory structure as indicated in FIG. 2.

That is, a selector 234b (236b) and a selector 234c (236c) are provided between a row address and a column address of the memory medium 234a (memory medium 236a), and between an x address and a y address thereof, and a "longitudinal/lateral selection signal S" defined when a component of a dot pattern is judged is applied as a condition for switching the selector 234b (236b) and the selector 234c (236c). As a result, the row address, the column address, the x address, and the y address can be simply converted.

FIG. 3 represents one example of a conversion relationship between the logic state of the longitudinal/lateral selection signal S, and the memory addresses (row addresses, column address), and also the real addresses (x address, y address). In other words, in the case of this embodiment, when the longitudinal/lateral selection signal S is equal to "0", the row address of the memory is the y address and the column address thereof is the x address. When the longitudinal/lateral selection signal S is equal to "1", the row address of the memory is the x address and the column address thereof is the x address.

In such a case that the memory structure of FIG. 2 is applied to the printer control apparatus 200 according to this embodiment mode, shown in FIG. 1, it is required to judge as to whether the dot pattern expanded in the data processing unit 221 corresponds to the x component, or the y component.

Figure 9:
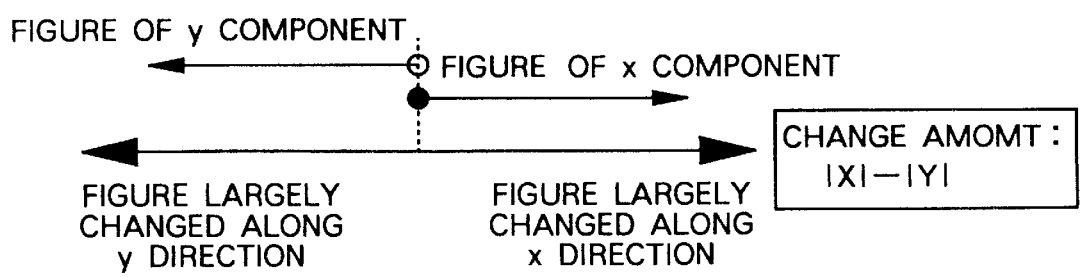
FIG. 9 is a conceptional diagram for showing an example of a sort judging condition for the dot pattern used in the memory access control method and the memory access control apparatus, according to one embodiment of the present invention.

To this end, in accordance with this embodiment, a judgment is made in the memory control unit 224 as to whether the expanded dot pattern is equal to the x component, or the y component based upon the judgment condition shown in FIG. 9.

In other words, assuming now that a coordinate value of a starting point of the dot pattern expanded in the data processing unit 221 shown in FIG. 1 is (x1, y1), and also a coordinate value of an end point thereof is (x2, y2), [x2−x1] of the coordinate element is compared with [y2−y1] of the coordinate element. Then, it may be judged that the coordinate element having the larger change amount owns the larger component for constituting the dot pattern.

This judgment condition represented in FIG. 9 may be expressed by the following formulae (1) and (2), assuming that the starting-point coordinate is (x1, y1), and the end-point coordinate is (x2, y2):

formula (1): judging formula of x component:

$$|(x2-x1)|-|(y2-y1)| \geq 0 \qquad (1)$$

formula (2): judging formula of y component:

$$|(x2-x1)|-|(y2-y1)| < 0 \qquad (2)$$

According to the formula (1), when [x2−x1]−[y2−y1] is larger than, or equal to 0, it can be judged that the figure is constituted by the x component. According to the formula (2), when [x2−x1]−[y2−y1] is smaller than 0, it can be judged that the figure is constituted by the y component.

With employment of the above-described means, the expanding process operation of the print data eccentrically containing the x components, and also the expanding process operation of the print data eccentrically containing the y components can be carried at in a high speed.

However, in the case that the judgment is made based only on either the x component or the y component as shown in FIG. 2, when the change amount of [X] is equal to the change amount of [Y] as in the oblique line, the processing performance could not be improved even if any of the highspeed memories is used.

To solve this problem, in accordance with this embodiment mode, an oblique-direction highspeed memory 235 with a memory structure (address mapping) as indicated in FIG. 6 is further employed as an oblique-line exclusively used memory. When this memory structure of FIG. 6 is employed, since the y components are accessed every 1 dot, the highspeed access operation can be realized by the page mode of the DRAM (namely, access operation is performed by that row address is fixed and only column address is switched). On the other hand, the highspeed access operation for the x components can be realized by way of the effect for banking the data width and the memory. In other words, since the oblique-line exclusively used memory can be accessed to some extent as to the x direction and also the y direction, there is such a highspeed access effect with respect to the access operation of the oblique direction in which both the x address and the y address are changed.

When the memory structure shown in FIG. 6 is applied to the printer control apparatus of FIG. 1, such a judgment is required that a dot pattern-expanded in the data processing unit 221 corresponds to an x component, a y component, or an oblique component.

Figure 10:
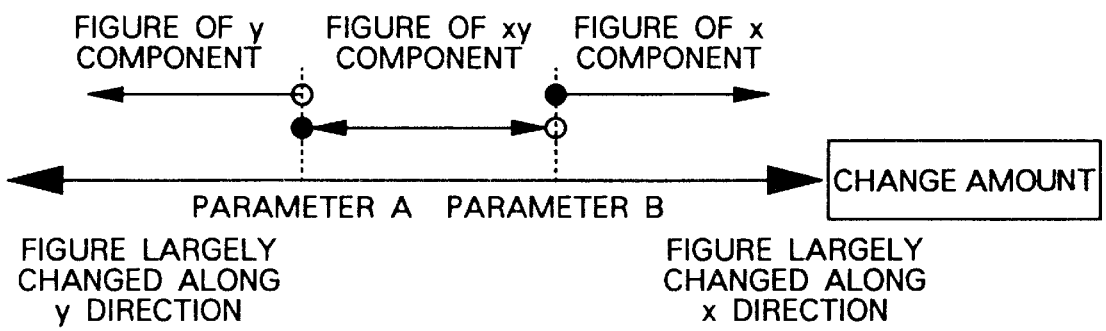
FIG. 10 is a conceptional diagram for showing an example of a sort judging condition for the dot pattern used in the memory access control method and the memory access control apparatus, according to one embodiment of the present invention.

To this end, in accordance with this embodiment mode, this judgment is performed in the memory control unit 224 based on a judgment condition represented in FIG. 10.

It is now assumed that a coordinate value of a starting point of a dot pattern expanded in the data processing unit 221 of FIG. 1 is set to (x1, y1), and a coordinate value of an end point of this dot pattern is set to (x2, y2). The selection bases for selecting any of the respective exclusively-used memories, namely the longitudinal/lateral-direction highspeed memory 234(1), the oblique-direction highspeed memory 235, and the longitudinal/lateral-direction highspeed memory 236(2) are different from each other, depending upon the characteristics of the memory elements for constituting these exclusively-used memories. Accordingly, parameters are set in order that these selection bases can be varied, and these parameters can be arbitrarily and externally set to the parameter setting units 222 and 223.

The coordinate information about the starting point and the end point which are sent from the data processing unit 221 is calculated by the memory control unit 224, and then the parameter A set to the parameter setting unit 222 is compared with the parameter B set to the parameter setting unit 223, so that it is possible to judge as to whether this dot pattern corresponds to the x component, the y component, or the xy component (oblique component).

Assuming now that the starting-point coordinate value is selected to be (x1, y1) and the end-point coordinate value is selected to be (x2, y2), the judgment condition of FIG. 10 may be expressed by the below-mentioned formulae (3), (4), and (5):

formula (3): judging formula of x component;

$$|(x2-x1)|-|(y2-y1)| \geq \text{parameter } B \qquad (3)$$

formula (4): judging formula of xy component;

$$\text{parameter } A \leq |(x2-x1)|-|(y2-y1)| < \text{parameter } B \qquad (4)$$

formula (5): judging formula of y component;

$$|(x2-x1)|-|(y2-y1)| < \text{parameter } A \qquad (5)$$

In accordance with the above-described formula (3), when [x2−x1]−[y2−y1] is larger than, or equal to the parameter B, it is possible to judge that the figure is constructed of the x component (lateral line). Also, in accordance with the above-described formula (4), when [x2−x1]−[y2−y1] is larger than, or equal to the parameter A and is smaller than the parameter B, it is possible to judge that the figure is constructed of the xy component (oblique line). Also, in accordance with the above-described formula (5), when [x2−x1]−[y2−y1] is smaller than the parameter A, it is possible to judge that the figure is constructed of the y component (longitudinal line).

As previously described, in accordance with this embodiment mode, the full dot memory 230 managed by the two-dimensional address is arranged by the respective exclusively-used memories such as the longitudinal/lateral-direction highspeed memory 234(1), the oblique-direction highspeed memory 235, and the longitudinal/lateral-direction highspeed memory 236(2). When the dot pattern is written into any of these exclusively-used memories, the component of this dot pattern is judged. Depending upon the sort of this judged component, changing of the x address and the y address is controlled which are supplied via the address lines 231, 232, 233 to the respective exclusively-used memories, if required, and also one of these exclusively-used memories is selected. As a consequence, the occurrence of the expanding performance (expand requiring time) time can be avoided which is caused by such a fact that the expanding direction of the dot pattern is different from the address mapping of the memories. Also, the time required to access the memories can be shortened, and further the memory accessible number within a predetermined time period can be increased.

As a result, when the memory access control apparatus according to this embodiment mode is applied to the printer control apparatus, the dot data can be expanded from the print data into the full dot memory 230 in a high speed in such a case that the dot data expanded from this print data received from the host-sided channel apparatus 100 is expanded into the full-dot memory 230. In this case, depending upon such a fact that this expanded dot data corresponds to the x component (lateral line) shown in the left side of FIG. 8, the y component (longitudinal line) indicated in the right side of FIG. 8, or the xy component (oblique line) indicated in other portions of FIG. 8, a selection can be made of the longitudinal/lateral-direction highspeed memory 234 (1), the longitudinal/lateral-direction highspeed memory 236(2), and the oblique-direction highspeed memory 235, in which the time required to write the relevant dot data is the shortest writing time. Then, the relevant dot data can be written into the selected highspeed memory.

As a result, for example, in the continuous printing operation for the plural pages, the delays of the printing operation can be avoided and thus the printing operation can be done in the high throughput. The delays of the printing operation are caused by that the printer 300 is stopped until the dot data expansion to the full dot memory 230 is completed.

Also, since the printer control apparatus 200 is arranged by the memory logic hybrid LSI, the printer control apparatus 200 can be considerably made compact, operable under high speed, and also low power consumption. In this memory logic hybrid LSI, the memory elements for constructing the intermediate buffer 210 and the full dot memory 230, and also the data processing processor 220 having the control function (will be discussed later) and the control logic capable of realizing the selector 240 are mounted, or packaged on the same LSI chip.

A memory logic hybrid LSI owns the following three features by mounting a control LSI and a memory on a printed circuit board in a mixture manner, although these control LSI and memory are conventionally and separately mounted in a printed circuit board.

(1) Since the interface lines are greatly increased, the memory with the multiple bank structure can be easily constructed. As a result, the memory access operation can be done in high speeds.

(2) Since the memory logic hybrid LSI is made by a single chip, the entire LSI chip can be made compact.

(3) Since the lead pins of the LSI and the memory element are no longer required, the capacitance is reduced, so that the memory logic hybrid IC can be operated under low power consumption and in high speeds.

While the present invention has been described in detail on the basis of the various preferred embodiments, the present invention is not limited to these embodiments, but may be apparently modified, changed, and substituted without departing from the technical spirit and the technical scope of the present invention.

For instance, the memory access control method/apparatus of the present invention may be applied not only to the full dot memory employed in the print control apparatus, but also may be applied to general-purpose memories which are widely used so as to expand bit map data such as graphic data outputted on a display.

What is claimed is:

1. A memory access control method comprising the steps of:

managing a plurality of memories constituting a full dot memory and based upon address mapping logically or physically different from each other;

judging a directivity of address changes from a starting point to an end point in a data set used to continuously access said memories;

selecting a memory suitably accessible by said data set from said plurality of memories in accordance with said directivity of the address changes in said data set;

causing said data set to access said selected memory; and said managing step includes a step for mutually changing the address of mapping owned by said plurality of memories.

2. A memory access control apparatus comprising:

a plurality of memories, the address mapping of which is logically, or physically different from each other, and which are managed by a two-dimensional address constructed of a first address and a second address;

address changing means for mutually changing said first address and said second address;

judging means for judging a directivity of address changes in a data set continuously accessible to said memories; and selecting means for selecting said memories accessed, depending upon sorts of said directivity.

3. A memory access control apparatus as claimed in claim 2 wherein:

said memory access control apparatus is constituted by a memory logic hybrid LSI made by that said memories, and a control logic capable of realizing at least one of said address changing means, said judging means, and said selecting means are packaged with the same LSI chip.

4. A memory access control apparatus as claimed in claim 2 wherein:

said memory access control apparatus is constructed of a memory logic hybrid LSI capable of solving a problem of an interface, and of readily achieving low power consumption and a compactness, while since both said memories and said control logic realizing at least one of said changing means, said judging means, and said selecting means are packaged within the same LSI chip, a limitation in a total number of wiring lines provided among said respective means can be eliminated, and also said total number of the wiring lines can be considerably increased.

* * * * *